United States Patent [19]

Kopera, Jr. et al.

[11] Patent Number: 5,519,557
[45] Date of Patent: May 21, 1996

[54] POWER SUPPLY POLARITY REVERSAL PROTECTION CIRCUIT

[75] Inventors: Joseph J. Kopera, Jr., Trenton; Thomas J. Wand, Canton, both of Mich.

[73] Assignee: Chrysler Corporation, Auburn Hills, Mich.

[21] Appl. No.: 155,941

[22] Filed: Nov. 19, 1993

[51] Int. Cl.$^6$ ............................................. H02H 3/18
[52] U.S. Cl. ................................. 361/84; 361/77
[58] Field of Search .......................... 361/84, 33, 77; 307/95, 303, 571

[56]  References Cited

U.S. PATENT DOCUMENTS

| | | | |
|---|---|---|---|
| 4,260,910 | 4/1981 | Colman | 307/303 |
| 4,423,456 | 12/1983 | Zaidenweber | 361/77 |
| 4,679,112 | 7/1987 | Craig | 361/33 |
| 5,012,381 | 4/1991 | Elliott | 361/84 |
| 5,077,486 | 12/1991 | Marson et al. | 307/95 |
| 5,079,608 | 1/1992 | Wodarczyk et al. | 357/23.13 |
| 5,134,321 | 7/1992 | Mehta | 307/571 |

Primary Examiner—A. D. Pellinen
Assistant Examiner—S. Jackson
Attorney, Agent, or Firm—Christopher A. Taravella

[57]   ABSTRACT

A power supply polarity reversal protection device includes a voltage controlled switching device, e.g. an N-channel MOSFET connected between the power supply output (e.g. a positive supply voltage) and the circuit to be powered by the supply, i.e. the load. A diode, preferably the parasitic diode inherent in the MOSFET between the drain and source, is arranged so that when the positive supply terminal is connected to the transistor, the diode is forward biased and will allow a diode current to flow. A sensing means generates a control terminal voltage in response to the diode current flow. This control terminal voltage is applied to the switching means control gate and is sufficient to cause full conduction through the switching means. If, instead, a negative supply voltage is connected to the transistor, the diode will be reverse biased and no current will flow. Since there is no diode current, the sensing means will not generate a control terminal voltage and the switching means will not turn on, thus protecting the load.

11 Claims, 3 Drawing Sheets

5,519,557

POWER SUPPLY POLARITY REVERSAL PROTECTION CIRCUIT

BACKGROUND OF THE INVENTION

The invention relates to a power supply polarity reversal protection circuit and, more particularly, to a device for protecting a load circuit from a power supply connected with reversed polarity.

Most modern electronic circuits are intolerant of being connected to a power supply with reversed polarity. Reversing the polarity will typically render a circuit inoperative, and may also permanently damage or destroy the more sensitive components in the circuit. The most common method of protecting a circuit from a reversed supply voltage is to place a diode between a power supply terminal and the circuit. The diode will allow current to flow from the power supply to the circuit when the diode is forward biased from a correctly polarized supply, but will not allow current to flow when the power supply is connected in the reverse direction. This method has the disadvantage that there is always a power loss from the current flow through the diode. In addition, there is typically a forward voltage drop of about one volt across the diode, thus reducing the voltage level available to the circuit.

Other methods for protecting a circuit from a reversed power supply involve complex circuitry and specialized integrated circuits. U.S. Pat. No. 4,260,910 to Colman discloses an integrated circuit with a built-in power supply protection. This circuit is not off-the-shelf and includes a transistor, two resistors, and a diode. This circuit provides limited reverse polarity protection through an integrated resistor which may heat up if a power supply is connected with reversed polarity.

U.S. Pat. No. 4,426,658 to Gontowski discloses an integrated circuit with protection against a reversed power supply. The disclosed circuit includes several transistors, diodes, resistors, and a fusible link.

While these methods may be suitable for the particular purpose which they address, or for general use, they would not be suitable for the purpose of the present invention because of their complexity and/or inherent power loss.

SUMMARY OF THE INVENTION

It is an object of the present invention to provide a power supply polarity reversal protection circuit that will effectively protect a circuit from the harmful effects of being connected to a power supply with reversed polarity.

It is another object of the invention to provide a polarity reversal protection circuit that minimizes power loss.

It is a further object of the invention to provide a polarity reversal protection circuit that involves minimal components.

In an illustrative embodiment of the present invention, the power supply polarity reversal protection circuit comprises a metal oxide silicon field effect transistor ("MOSFET") and a sensing means. A first terminal, either the drain or source of the transistor, depending on the normal polarity of the power supply and the type of MOSFET (i.e., P or N), is connected to the output terminal of the power supply, and the second or other terminal of the MOSFET is connected to the load, i.e. the circuit to be powered by the power supply. The sensor circuit is located in the load and has an output connected to the gate of the MOSFET that produces a signal that turns the transistor on if current is flowing to the load.

A typical MOSFET has an inherent parasitic diode between its drain and source. When the power supply output terminal has the correct polarity and is connected to the first transistor terminal, the parasitic diode is forward biased and will allow a diode current to flow from the first terminal to the second terminal through the diode. The sensing means, in response to the diode current flow, generates a gate control voltage sufficient to cause full conduction between the drain and source of the transistor.

If power supply terminal is connected in reverse to the first transistor terminal, the diode will be reverse biased and will not allow the diode current to flow. Without a flow of diode current, the sensing means will not generate a gate control terminal voltage, thus MOSFET will not be turned on.

BRIEF DESCRIPTION OF THE DRAWINGS

The foregoing and other features of the present invention will be more readily apparent from the following detailed description of preferred embodiments taken in conjunction with the attached drawings wherein.

DETAILED DESCRIPTION OF THE PREFERRED EMBODIMENTS

Figure 1:
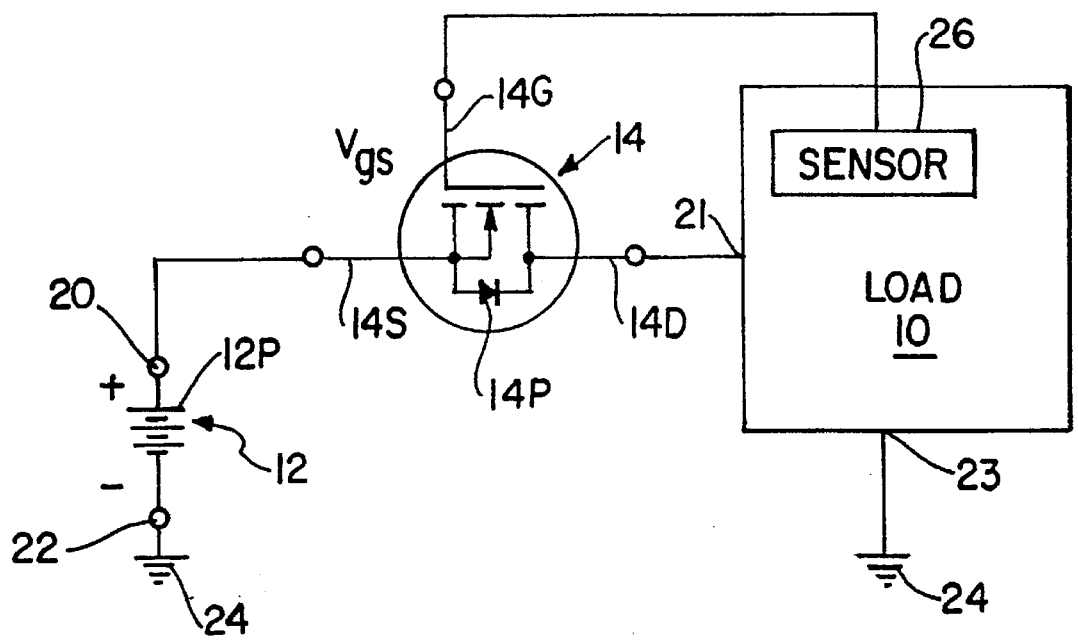
FIG. 1 is a circuit diagram showing a first embodiment of the present invention using an N-channel MOSFET transistor.

FIG. 1 illustrates a first embodiment of the present invention in the form of an N-channel MOSFET 14 connected between a load 10 and a battery 12. Inherent in the MOSFET is a parasitic diode 14P, which is connected between the MOSFET source 14S and drain 14D. The MOSFET 14 will turn on and permit a larger current flow between the source 14S and drain 14D with a small voltage drop, when voltage between the gate 14G and source 14S, Vgs, is greater than the MOSFET's threshold voltage.

The battery 12 is the power supply for the load and it has a positive supply terminal 20 and a negative supply terminal 22. The negative supply terminal is connected to ground 24 and the positive terminal is connected to the source 14S of the MOSFET. A terminal 21 of the load 10 is connected to the drain 14D of the MOSFET 14 and a terminal 23 of the load 10 is connected to ground 24. In FIG. 1, the battery is shown correctly oriented with respect to the N-channel MOSFET and the load.

With the battery 12 correctly oriented, parasitic diode 14P will be forward biased, providing a path for a small current from the positive supply terminal 20 to the load 10 through the parasitic diode 14P of the MOSFET 14.

Figure 4:
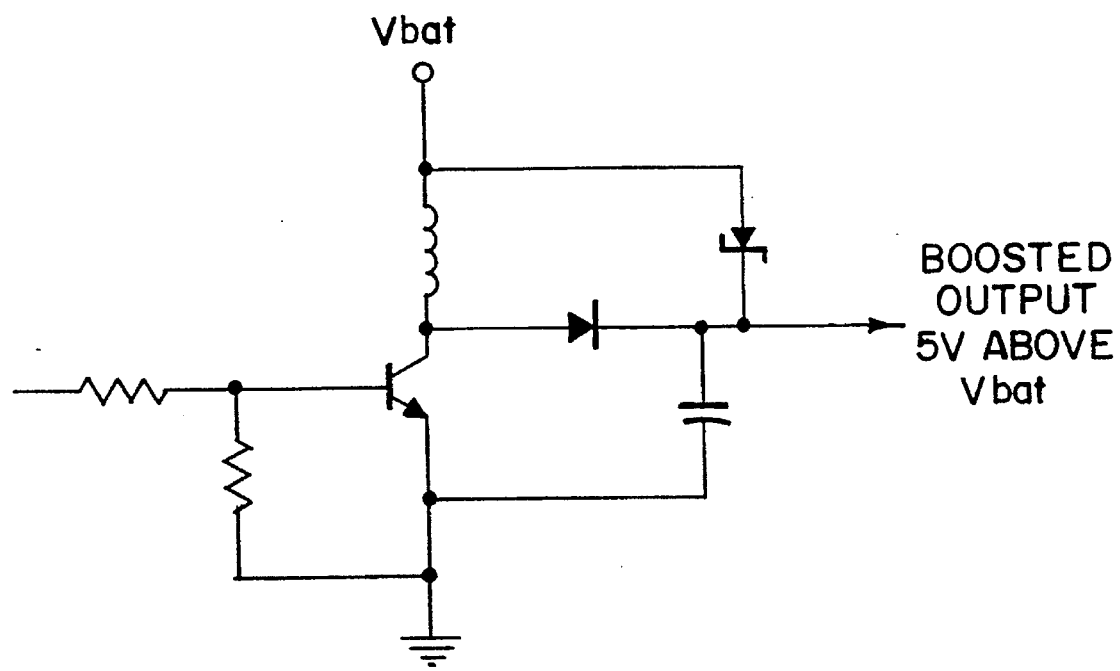
FIG. 4 is a circuit diagram, illustrating a sensor useful in the present invention.

The load has a sensor circuit 26, whose input monitors the diode current through parasitic diode 14P and whose output is connected to the gate 14G of the MOSFET. The sensor output is capable of supplying a voltage to the gate 14G. The sensor circuit 26 may be any one of a number of circuits capable of outputting a voltage higher than a voltage received as an input. One example of such a circuit is a voltage multiplier illustrated in FIG. 4. Once a small current is supplied to the load 10 through the parasitic diode 14P, the sensor 26 generates a gate voltage that is preferably about 5 volts higher than the supply voltage. Since the voltage at the source 14S is substantially the same as the supply voltage, Vgs will be approximately 5 volts. A Vgs of approximately 5 volts is sufficient to ensure that the MOSFET is turned on and is able to conduct the full supply current between the source 14S and drain 14D to the load 10.

By this arrangement, when the battery is correctly oriented, a small current will initially flow through the parasitic diode 14P from the source 14S to the drain 14D. This small current is used to generate a gate voltage that exceeds the supply voltage by several volts, to ensure that Vgs is positive and of sufficient magnitude to turn on the MOSFET forming a conducting channel between the source and drain. Once the conducting channel is formed, a large current can flow between the positive supply terminal and the load with very low loss.

When the battery is not correctly oriented, the parasitic diode 14P will be reverse biased. The reverse biased parasitic diode will not allow a current to flow to the load 10. With no current received, the sensor 26 will not generate a gate voltage. As a result the MOSFET will not be turned on and no harmful current will flow to the load, and the reverse voltage will not be applied to load input terminal 21. Thus the load will be effectively protected from the reversed polarity supply.

Figure 2A:
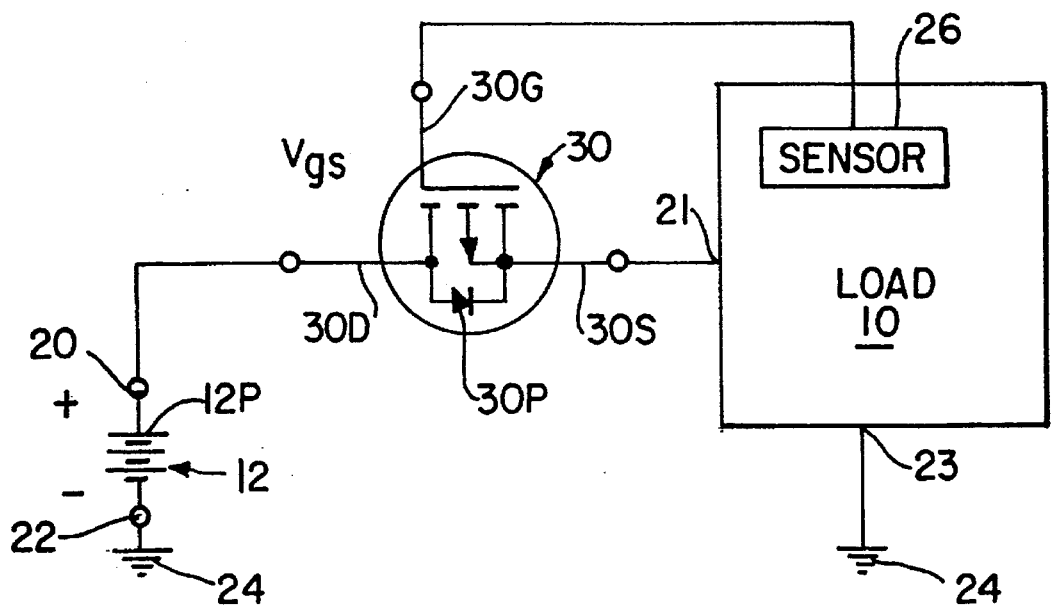
FIGS. 2A and 2B are circuit diagrams, showing a second embodiment of the present invention, using a P-channel MOSFET transistor where positive and negative supplies, respectively, are used.
Figure 2B:
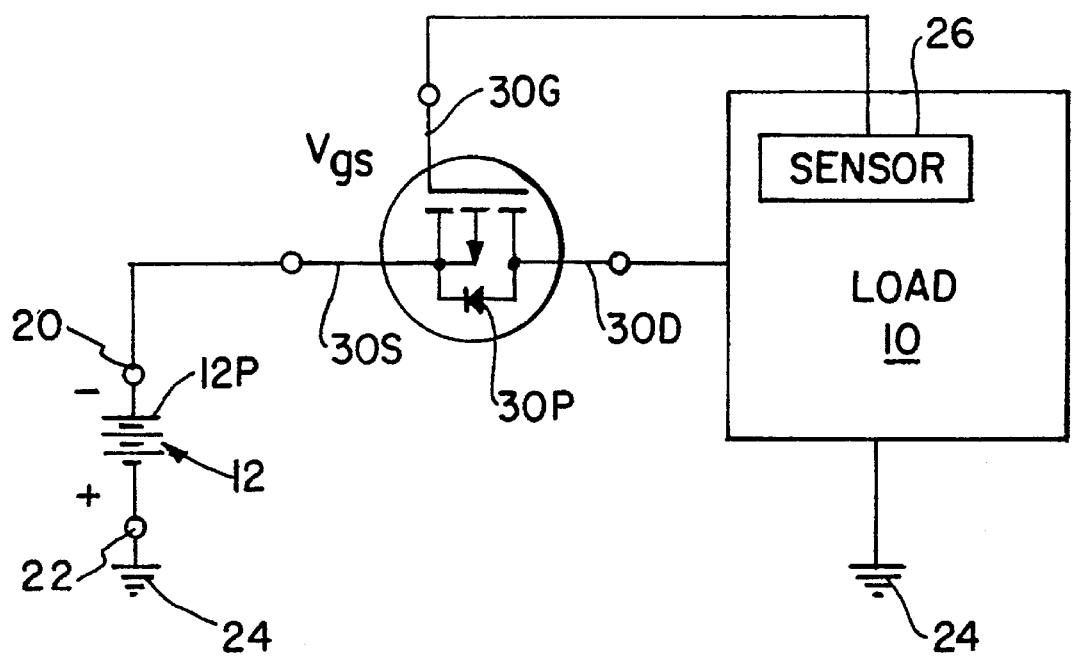

A second embodiment, shown in FIGS. 2A and 2B, contemplates the same concept as the first embodiment, the key difference being that a P-channel MOSFET is used. The P-channel device is slightly more expensive than the N-channel, but works in substantially the same manner, with a slightly different arrangement.

The P-channel MOSFET 30 passes current in the opposite direction from an N-channel MOSFET and its parasitic diode 30P is the reverse of that in an N-Channel MOSFET. Thus it can be connected in a reverse direction for a positive supply voltage as shown in FIG. 2A or the same direction for a negative supply voltage as shown in FIG. 2B. In FIG. 2A, drain 30D is connected to the positive supply terminal 20. The source 30S is connected to the load 10. The sensor 26 in load 10 supplies a voltage to the gate 30G that is lower than the supply voltage in order to create a voltage Vgs that is negative and of sufficient magnitude to form a conductive channel between the drain 30D and the source 30S in the P-channel MOSFET. The sensor could in fact supply a voltage of ground potential to the gate 30G of the P-channel MOSFET. What is necessary for the proper operation as a battery protector, is that the sensor supply the voltage to the gate 30G in response to a current flowing into the load 10 through the parasitic diode between the drain 30D and the source 30S in such a way as to turn on the MOSFET.

In FIG. 2B, source 30S is connected to the negative supply terminal 20. The drain 30D is connected to the load 10. With the battery 12 properly oriented, parasitic diode 30P will be forward biased, allowing current to flow from the load 10 through the parasitic diode 14P between the drain 30D and the source 30S. In response to the current flow, the sensor 26 in load 10 supplies a voltage to the gate 30G that is lower than the supply voltage in order to create a voltage Vgs that is negative and of sufficient magnitude to form a conductive channel between the drain 30D and the source 30S in the P-channel MOSFET.

It is obvious to one skilled in the art that the polarity reversal protector need not be limited to the above described embodiments. Other suitable configurations embodying the inventive concept may be utilized. What is novel is the use of a current through a diode to switch on a low resistance path for a large current flow through an alternate path.

Figure 3:
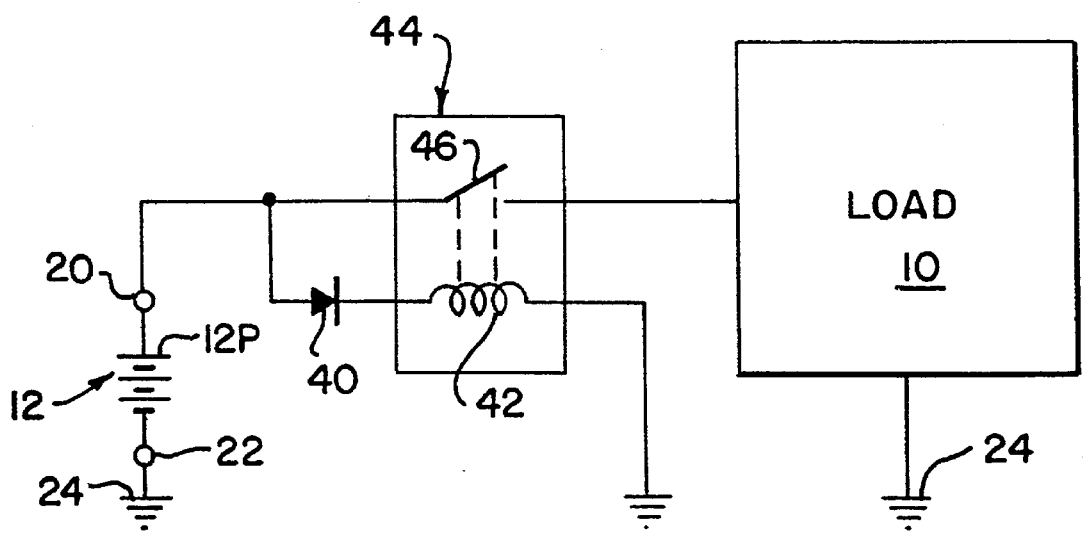
FIG. 3 is a circuit diagram, illustrating the inventive concepts of the embodiments of FIG. 1 and FIG. 2, using an electro-mechanical equivalent structure.

FIG. 3 illustrates the inventive concept, using an electromechanical equivalent structure that would not be as suitable as the transistor arrangement above. The electromechanical structure could serve the same purpose, but could not be as readily miniaturized, would be more expensive to produce, and could not be used in as wide a variety of applications.

With this arrangement, a diode 40 is connected to the positive supply terminal 20 of battery 12. Battery 12 is correctly oriented in FIG. 3. The diode 40 is also connected to a relay coil 42 of a relay 44. The load 10 is connectable to the positive supply terminal 20 through a switch 46 in the relay 44. When the battery 12 is correctly oriented, the diode 40 is forward biased, the relay coil 42 is energized, closing the relay switch 46, thereby creating a low resistance path from the positive supply terminal 20 of battery 12 to the load 10. When the battery 12 is not correctly oriented, the diode 40 is reverse biased, the relay coil 42 is not energized, the relay switch 46 is not closed, there is no path from the positive supply terminal 20 to the load, and the load is thereby protected.

While the invention has been particularly shown and described with reference to preferred embodiments thereof, it will be understood by those skilled in the art that various changes in form and details may be made therein without departing from the spirit and scope of the invention.

What is claimed is:

1. A power supply polarity reversal protection device comprising:

a voltage controlled semiconductor transistor switching device having a source and a drain connected between a power supply and a load and a gate for rendering said switching device conductive to supply a load current to the load from the power supply in response to a gating control voltage signal, said transistor also having an intrinsic diode connected between the power supply and load, for conducting current only when the polarity of the power supply relative to the load is correct and inhibiting conduction when the power supply polarity is not correct, and sensor means for detecting current flowing from the power supply through said intrinsic diode and generating the gating control voltage signal at an output in response thereto, said sensor means generated gating control voltage signal being applied to said switching device gate to operate said switching device to be conductive to conduct the load current therethrough between the power supply and the load.

2. The polarity reversal protection device of claim 1 wherein said sensor means produces a gating control voltage signal of a value greater than that of the power supply.

3. The polarity reversal protection device of claim 1, wherein the transistor is a MOSFET.

4. The polarity reversal protection device of claim 3, wherein the power supply for the load is designed to have a positive polarity, a drain and source of the MOSFET are connected between the load and power supply, and a gate of the MOSFET is connected to the sensor means output to receive said gating control voltage signal.

5. The polarity reversal protection device of claim 4, wherein the transistor is an N-channel MOSFET, the MOSFET source is connected to the power supply output, the drain is connected to the load, and the gate is connected to the sensor means output; and the gating control voltage signal of the sensor means output is more positive than the sum of the MOSFET threshold voltage and the power supply voltage.

6. The polarity reversal protective device of claim 5, wherein the gating control voltage signal is at least five volts more positive than the power supply voltage.

7. The polarity reversal protection device of claim 4, wherein the transistor is a P-channel MOSFET, the MOSFET drain is connected to the power supply output, the source is connected t the load, and the gate is connected to the sensor means output; and the gating control voltage signal of the sensor means is less positive than the sum of the threshold voltage and the power supply voltage.

8. The polarity reversal protection device of claim 7, wherein the gating control voltage signal is of ground potential.

9. The polarity reversal protection device of claim 3, wherein the power supply for the load has a negative polarity, a drain and source of the MOSFET are connected between the load and power supply, and a gate of the MOSFET is connected to the sensor means output.

10. The polarity reversal protection device of claim 9, wherein the transistor is a P-channel MOSFET, the MOSFET source is connected to the power supply output, the drain is connected to the load, and the gate is connected to the sensor means output; and the gating control voltage signal of the sensor means is more negative than the sum of the threshold voltage and the power supply voltage.

11. The apparatus as recited in claim 10, wherein the gating control voltage signal is of ground potential.

* * * * *